UNITED STATES PATENT OFFICE.

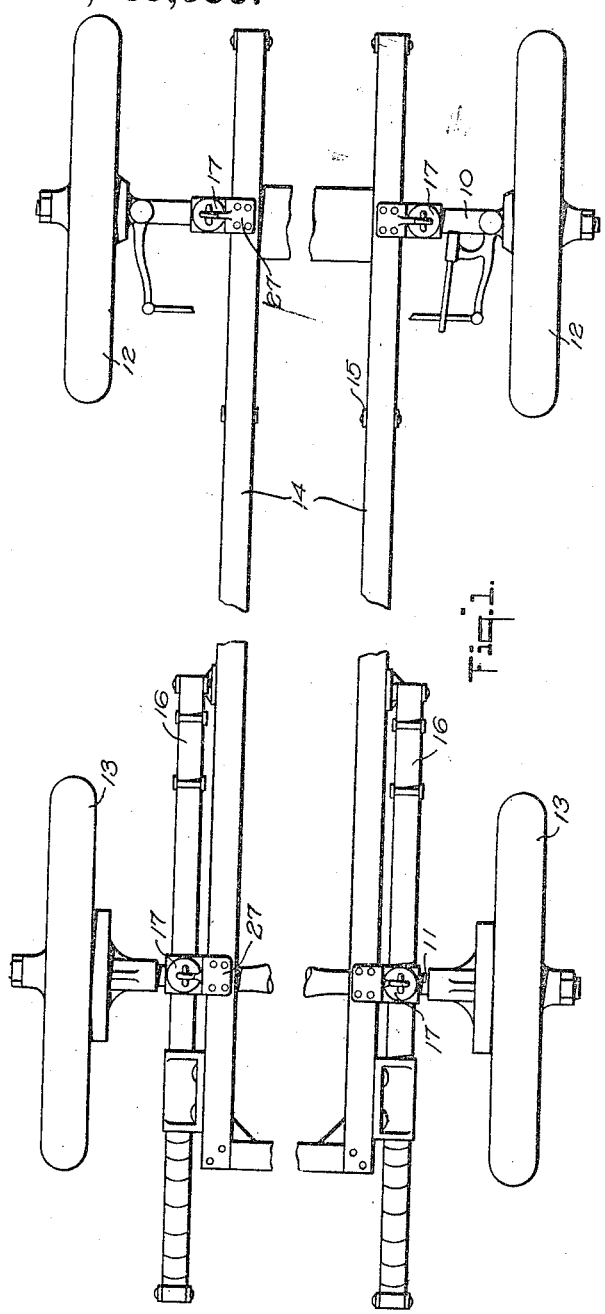
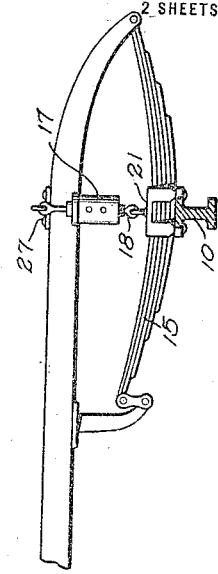
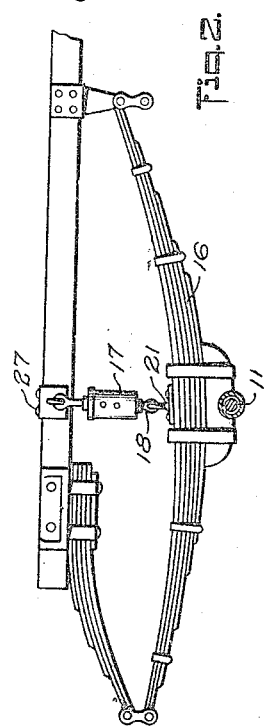

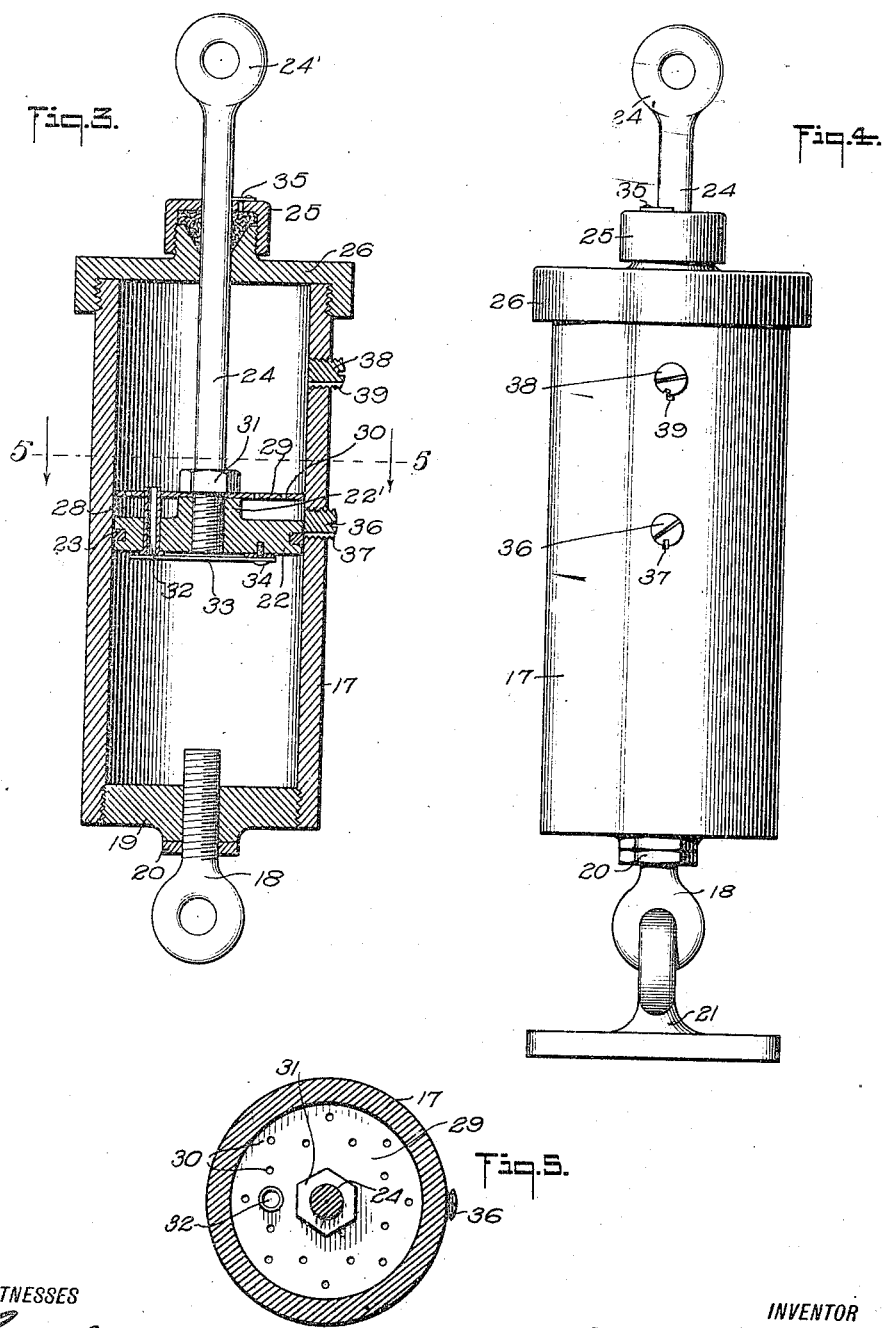

GEORGE W. MacKINNON, OF BOSTON, MASSACHUSETTS.

AUTOMATIC AIR-CUSHION.

1,169,050.   Specification of Letters Patent.   Patented Jan. 18, 1916.

Application filed June 18, 1915.   Serial No. 34,817.

*To all whom it may concern:*

Be it known that I, GEORGE W. MACKINNON, a citizen of the United States, and a resident of Boston, in the county of Suffolk and State of Massachusetts, have invented a new and Improved Automatic Air-Cushion, of which the following is a full, clear, and exact description.

This invention relates to carriages and wagons and has particular reference to automatic cushioning devices for use between the frames and the axles of automobiles or other vehicles whereby the shock incident to the bouncing or recoil of the springs is avoided.

Among the objects of the invention is to provide a cushioning device adapted to be easily and reliably connected to existing automobile structures at a minimum expense and involving an air cylinder and a piston therein supported upon a cushion of air, the parts being so arranged that the effectiveness of the cushion is variable automatically in proportion to the load to be sustained thereby.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 1 is a plan view indicating fragments of an automobile chassis having my improved cushioning devices applied thereto; Fig. 2 is a side elevation of the same, the wheels being omitted; Fig. 3 is a vertical sectional view of one of the air cushions; Fig. 4 is a side elevation of the same at right angles to the plane of the section of Fig. 3; and Fig. 5 is a transverse section on the line 5—5 of Fig. 3.

Referring now more particularly to the drawings, and by way of illustration of a preferred manner of connecting the cushioning devices to a conventional type of automobile chassis, I show at 10 and 11 front and rear axles of an automobile supported upon front and rear wheels 12 and 13. 14 indicates the longitudinal side bars of the chassis frame and 15 and 16 indicate the front and rear springs respectively.

While the function and operation of the springs 15 and 16 remain virtually unaffected by the application of this improvement to the vehicle, yet I provide means to regulate the speed of action of the springs within certain limits, especially to prevent the upward bouncing effect of the springs adding materially to the safety and life of the springs and comfort to the passengers. I apply therefore to the machine, preferably at each corner of the chassis adjacent the wheels, air cushioning devices preferably of the type shown in the detail views, each comprising a barrel or cylinder 17 having an anchor 18 in the form of an eyebolt tapped and hence adjustably secured in the end plug or closure 19 at one end of the cylinder, the adjustment of the eyebolt longitudinally of the cylinder being fixed by means of a lock nut 20. The eyebolt is designed to be flexibly connected to a bracket 21 secured to or adjacent one of the axles, such connection permitting a hinge movement forwardly or laterally in any direction but preventing longitudinal displacement of the eyebolt and cylinder except as permitted by the adjustment through the threaded shank.

Within the cylinder is slidably fitted a piston 22 having an airtight packing ring 23 and having secured to the center thereof in any suitable manner a piston rod 24 extending through a packing gland 25 in a cap 26 secured to the upper end of the cylinder 17 in any suitable rigid air-tight manner. The upper end of the piston rod has an eye 24' through which the piston is connected to an upper bracket 27 secured to the frame 14 and permitting hinge movements in any direction as described in connection with the eyebolt 18. The piston is provided with a hub or extension 22' serving to make a more extended bearing for the threaded end of the rod 24 secured therein and also providing for an oil space 28 above the piston or between the piston and the plate 29 having a plurality of small holes or perforations 30 therethrough. The plate is secured in place by means of a lock nut 31 against its upper face.

At 32 is shown a tubular air port extending vertically through the piston and plate, the lower end of which is normally held closed by a flexible valve 33 secured at 34 on the side of the piston opposite the port 32 and opening downwardly relatively to the piston. The tube providing the air port extends somewhat above the upper surface of the plate 29 whereby any oil admitted into the upper end of the cylinder will pass through the perforations 30 into the space 28 where it will be in position to keep the inner surface of the cylinder lubricated where acted upon by the packing ring 33. No free oil, however, will pass the piston and collect in the bottom of the cylinder. Oil may be introduced into the upper end of the cylinder in any suitable manner as, for instance, through an inlet 35 formed in the gland cap 25 whereby the gland may be maintained lubricated as well as to supply oil into the interior of the cylinder.

The piston subject to the normal up and down vibration of the vehicle frame is adapted to float or reciprocate up or down in the cylinder, the normal carrying position, however, being substantially midway between the ends thereof. Substantially midway between the ends of the cylinder is fitted an adjustable plug 36 providing in connection with the cylinder wall an adjustable relief port 37. The area of the port 37 is varied by rotating the plug slightly around its axis. Near the upper end of the cylinder is provided another plug 38 having a similar variable port 39. The two ports 37 and 39 are designed to control the movement of air out of and into the interior of the cylinder exclusively. That portion of the cylinder below the port 37 being hermetically closed and the piston being fitted airtight in the cylinder, all of the air trapped below the piston will act as a cushion resiliently sustaining the load connected to the piston rod 24. As stated, the normal position of the piston is substantially as shown in Fig. 3, with a degree of compression of the air beneath it proportional to the load carried. If the machine runs into a chuck hole causing the load to move the piston downwardly, the cushion of air beneath it will resist a too great downward thrust, and it, together with the springs, will again lift the load, the upward movement, however, being retarded by the air cushion above the piston admitted through the inlet port 39. The degree to which the retarding effect operates will depend upon the area of the inlet port. In other words, if the upward movement is to be made comparatively slow, the inlet port will be restricted, and if a more rapid upward movement is desired it will be opened according to the desire in each particular case determined by experiment. The port 32, however, is larger than the inlet port 39, and while the piston is moving upwardly a greater portion of the air above the piston will pass through the port 32 into the lower end of the cylinder than will pass out through the inlet port. Ordinarily, therefore, the piston will act as a pump tending to deliver air through the port 32 into the lower end of the cylinder. When, however, the amount of air entrapped beneath the piston overcomes the force of the load tending to hold the piston in its normal position sealing the outlet port 37, the excess air will pass automatically out through the port 37 until the piston sinks again to its normal position. It will be seen, therefore, that irrespective of the variations in loads carried by the machine, the piston will be maintained normally at about the same level.

I claim:

1. In an automatic air cushion, the combination of a rigid cylinder, means to anchor one end of the cylinder in position fixed from longitudinal movement, said cylinder having adjustable inlet and outlet ports, a piston slidable within the cylinder with an airtight fit, a piston rod secured to the piston and extending thence through the opposite end of the cylinder, a packing gland surrounding the piston rod, a plate secured to the piston and providing an oil space between the plate and the piston, and an air port tube extending through the piston and plate, the upper end of the tube reaching above the upper surface of the plate.

2. In an automatic air cushion for automobiles, the combination of a cylinder having variable inlet and outlet air ports, the outlet port being substantially at the longitudinal center of the cylinder, a piston slidably fitted in the cylinder with an airtight fit and operated normally just below the outlet port, said piston having an upwardly projecting hub, a perforated plate applied against the upper end of the hub providing an oil space between the plate and the main portion of the piston, a piston rod extending through the plate and into the hub and locking the plate thereto, an air port tube extending through the piston and plate parallel to the axis of the piston rod, a valve secured to the lower portion of the piston and adapted to close the lower end of the tube but opening downwardly on the upstroke of the piston, and means to supply oil into the upper portion of the cylinder whence it passes through the plate into the aforesaid space.

3. The combination of an air cushion comprising a cylinder, a piston reciprocating therein in an airtight manner, means to admit air in regulatable quantities into the upper end of the cylinder, the piston being provided with a passageway for the air to pass downwardly through the piston, a check valve to prevent the air to pass upwardly through the piston, and means adjacent the middle portion of the cylinder to regulate automatically the quantity of air below the piston according to the load sustained by the piston irrespective of any variations thereof.

GEORGE W. MacKINNON.

Witnesses:
T. FRANK MALONEY,
E. A. BYRNE.